(12) United States Patent
Le

(10) Patent No.: US 6,741,076 B2
(45) Date of Patent: *May 25, 2004

(54) EDDY CURRENT MEASURING SYSTEM FOR MONITORING AND CONTROLLING A CMP PROCESS

(76) Inventor: Cuong Duy Le, 280 Cochrane Cir., Morgan Hill, CA (US) 95037

( * ) Notice: Subject to any disclaimer, the term of this patent is extended or adjusted under 35 U.S.C. 154(b) by 0 days.

This patent is subject to a terminal disclaimer.

(21) Appl. No.: 10/417,042

(22) Filed: Apr. 14, 2003

(65) Prior Publication Data

US 2003/0201768 A1 Oct. 30, 2003

Related U.S. Application Data

(63) Continuation-in-part of application No. 09/835,975, filed on Apr. 17, 2001, now Pat. No. 6,549,006, which is a continuation-in-part of application No. 09/545,119, filed on Apr. 7, 2000, now Pat. No. 6,407,546.

(51) Int. Cl.$^7$ .............................. G01B 7/06; B24B 49/00
(52) U.S. Cl. ........................ 324/230; 451/8; 702/104; 702/170
(58) Field of Search ............................ 451/8; 702/170, 702/38, 104; 324/225, 228, 229, 230, 238, 240; 364/511.07

(56) References Cited

U.S. PATENT DOCUMENTS

| | | |
|---|---|---|
| 2,916,694 A | 12/1959 | Hanysz et al. |
| 4,727,322 A | 2/1988 | Lonchampt et al. |
| 4,849,693 A | 7/1989 | Prince et al. |
| 4,849,694 A | 7/1989 | Coates |
| 4,893,079 A | 1/1990 | Kustra et al. |
| 5,341,678 A | 8/1994 | Kervinen |
| 5,485,082 A | 1/1996 | Wisspeintner et al. |
| 5,525,903 A | 6/1996 | Mandl et al. |
| 5,552,704 A | 9/1996 | Mallory et al. |
| 5,559,431 A | 9/1996 | Sellen |
| 5,781,008 A | 7/1998 | Muller et al. |
| 5,963,031 A | 10/1999 | de Halleux et al. |
| 6,291,992 B1 | 9/2001 | van Andel et al. |
| 6,369,565 B1 | 4/2002 | Dobler et al. |
| 6,407,546 B1 | 6/2002 | Le et al. |
| 6,549,006 B2 | 4/2003 | Le |
| 2002/0053904 A1 | 5/2002 | Chen et al. |

FOREIGN PATENT DOCUMENTS

GB 2 112 944 A 7/1983

Primary Examiner—N. Le
Assistant Examiner—Darrell Kinder
(74) Attorney, Agent, or Firm—The Maxham Firm

(57) ABSTRACT

A method for estimating a thickness profile of a substrate sample that has undergone a chemical-mechanical polishing (CMP) process includes obtaining initial and terminating resistance and reactance measurements from the sample. Initial eddy current measurement values are obtained while an eddy current probe is positioned at an initial distance relative to the substrate sample, and terminating values are obtained while the eddy current probe is positioned at a modified distance relative to the sample. An intersecting line can be calculated using the initial and terminating resistance and reactance measurements. An intersecting point between a previously defined natural intercepting curve and the intersecting line may also be determined. A reactance voltage of the intersecting point may be located along a digital calibration curve to identify a closest-two of a plurality of calibration samples. The conductive top layer thickness of the substrate sample can then be determined by approximating a location, using linear or non-linear calculations, of the reactance voltage relative to the closest-two of the plurality of calibration samples.

28 Claims, 13 Drawing Sheets

Three-Dimensional Contour Map

EDDY CURRENT MEASURING SYSTEM FOR MONITORING AND CONTROLLING A CMP PROCESS

CROSS REFERENCE TO RELATED APPLICATIONS

This application is a continuation-in-part of U.S. application Ser. No. 09/835,975 filed Apr. 17, 2001, now U.S. Pat. No. 6,549,006, which is a continuation-in-part of U.S. application Ser. No. 09/545,119 filed Apr. 7, 2000, now U.S. Pat. No. 6,407,546.

BACKGROUND OF THE INVENTION

1. Field of the Invention

The present invention relates generally to an eddy current measuring system, and in particular to an eddy current measuring system for estimating the thickness of conductive films formed on semiconductor wafer products.

2. Description of the Related Art

In the semiconductor industry, critical steps in the production of semiconductor wafers are the selective formation and removal of films on an underlying substrate. The films are made from a variety of substances, and can be conductive (for example, metal or a magnetic ferrous conductive material) or non-conductive (for example, an insulator or a magnetic ferrite insulating material).

Films are used in typical semiconductor processing by: (1) depositing a film; (2) patterning areas of the film using lithography and etching; (3) depositing material which fills the etched areas; and (4) planarizing the structure by etching or chemical-mechanical polishing (CMP). Films may be formed on a substrate by a variety of well-known methods including physical vapor deposition (PVD) by sputtering or evaporation, chemical vapor deposition (CVD), plasma enhanced chemical vapor deposition (PECVD), and electrochemical process (ECP). Films may be removed by any of several well-known methods including chemical-mechanical polishing (CMP), reactive ion etching (RIE), wet etching, electrochemical etching, vapor etching, and spray etching.

The semiconductor fabrication industry continues to demand higher yields and shorter fabrication times, while insisting upon ever-increasing quality standards. A variety of inspection procedures have been employed during the various stages of the semiconductor wafer fabrication process in an attempt to meet these demands. These inspection procedures include destructive, as well as nondestructive, testing methods for analyzing wafer products.

In a destructive measuring process, a standard or electron microscope may be used to measure the thickness of a wafer's coating after a cross-section has been obtained. When the thickness of a thin-film coating is greater than 10,000 Å, for example, this type of destructive measuring method may provide accurate measurements. However, measuring accuracy usually begins to degrade as the coating thickness falls below the 10,000 Å threshold.

Other types of measuring processes utilize sensitive eddy current sensors which do not destroy or significantly alter the article measured. Although eddy current sensors provide highly accurate readings, these sensors are susceptible to error. For example, the shifting of an electronic reference point due to thermal drifting often occurs at some point during the data collection and inspection process. To compensate for thermal drifting and to ensure accurate readings, many existing eddy current sensors must be recalibrated on a periodic basis.

While there have been other attempts in addition to eddy current sensors to employ highly accurate, nondestructive measuring devices for estimating the thickness of a conductive top layer formed on a semiconductor wafer product, improvement is still needed.

SUMMARY OF THE INVENTION

A method for thickness estimation of a conductive top layer of a substrate, having previously undergone a metal deposition process or a metal layer removal process, includes obtaining initial and terminating resistance and reactance measurements from the conductive top layer of the substrate. The initial measurement values are obtained while the eddy current probe is positioned at an initial distance relative to the substrate, and the terminating values are obtained while the eddy current probe is positioned at a modified distance relative to the substrate. An inspection sample intersecting line can be calculated using the initial and terminating resistance and reactance measurements. An intersecting point between a previously defined natural intercepting curve and the substrate intersecting line may also be determined. A reactance voltage of the intersecting point may be located along a digital calibration curve to identify a closest-two of a plurality of calibration samples. The conductive top layer thickness of the substrate can then be determined by approximating a location, using linear or non-linear calculations, of the reactance voltage relative to the closest-two of the plurality of calibration samples.

BRIEF DESCRIPTION OF THE DRAWING

The above and other aspects, features and advantages of the present invention will become more apparent upon consideration of the following description of preferred embodiments taken in conjunction with the accompanying drawing, wherein.

DETAILED DESCRIPTION OF THE PREFERRED EMBODIMENTS

In the following description of preferred embodiments, reference is made to the accompanying drawings, which form a part hereof, and which show by way of illustration, specific embodiments of the invention. It is to be understood by those of ordinary skill in this technological field that other embodiments may be utilized, and structural, electrical, as well as procedural changes may be made without departing from the scope of the present invention.

Figure 1:
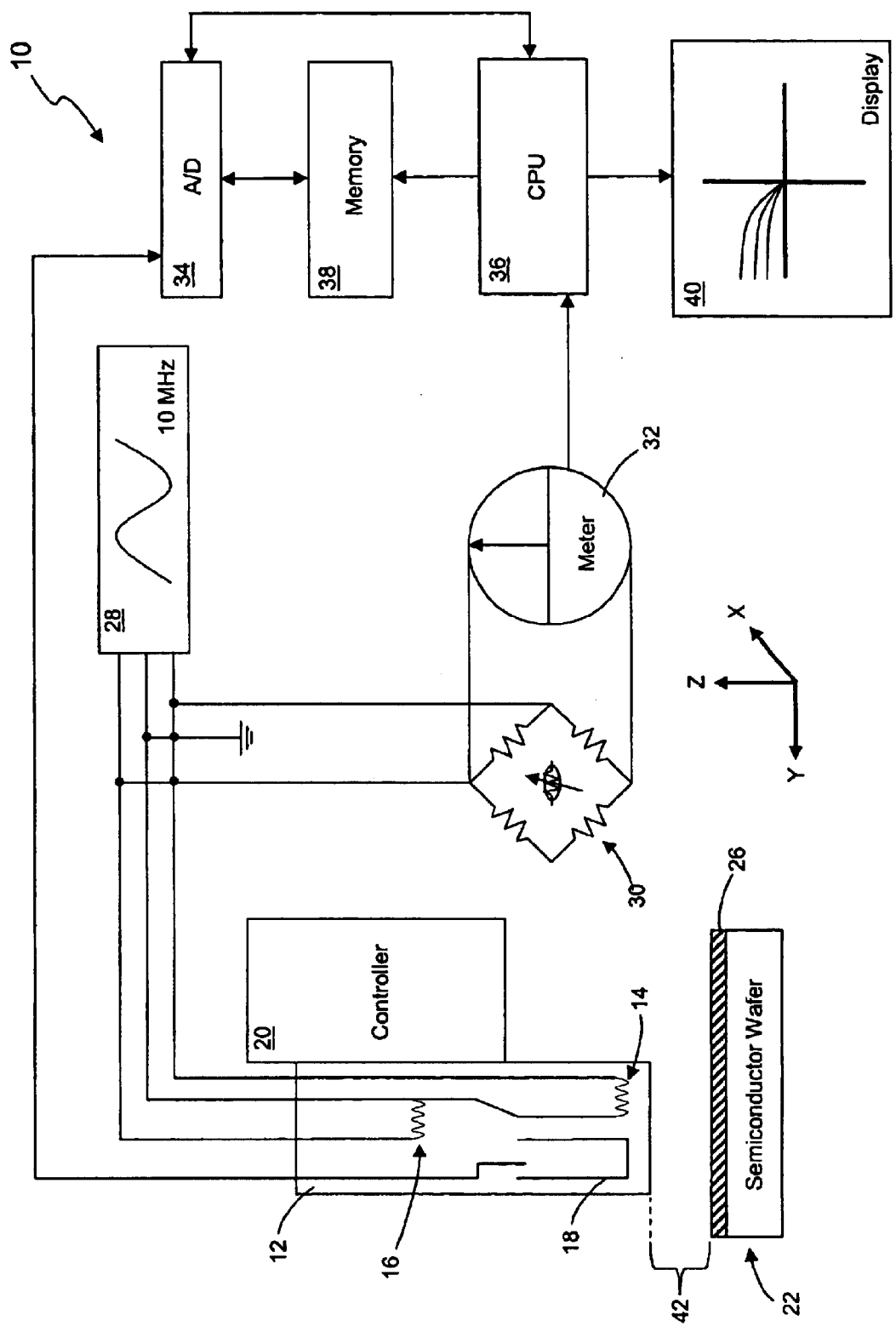
FIG. 1 is a diagram showing an eddy current measuring system in accordance with the invention.

FIG. 1 is a diagram showing a single-probe eddy current measuring system 10 in accordance with some embodiments of the present invention. As shown, the system includes a conventionally configured eddy current probe 12 having sense coil 14, reference coil 16, and capacitance sensor 18. The eddy current probe is shown in communication with controller 20, which, during operation, may provide relative motion between the eddy current probe and substrate 22. In a typical implementation, the controller translates the eddy current probe and included components along vertical axis Z, which is normal to the substrate.

The eddy current probe circuit may be implemented in any suitable manner. In one particular example, eddy current probe 12 may be constructed using similarly configured sense and reference coils 14, 16. If desired, the sense and reference coils may each be constructed using ferrite cores, equal coil turns, and similarly sized magnetic cable (for example, 40 gauge). The circuit may further include AC voltage source 28 for inducing an AC voltage to the sense and reference coils, and Wheatstone bridge 30. Suitable probes for implementing eddy current probe 12 include, for example, absolute pencil probes, model numbers SBS-30 or SB-30, developed by Andrew NDT Engineering, Inc., Morgan Hill, Calif.

In many implementations, AC voltage source 28 may provide pre-selected sinusoidal waves at a suitable frequency (for example, 1 MHz to 100 MHz, or higher) to the Wheatstone bridge. A sinusoidal wave is often utilized to maximize phase separation between samples of differing thicknesses, but such a wave pattern is not a required feature.

Sense and reference coils 14 and 16 may be fabricated so that their respective inductance values are equal at a given frequency, while the resistance of each coil is less than about 20 Ohms, for example.

In operation, analog signals generated by eddy current probe 12 may be fed into an analog to digital (A/D) board 34 which converts the analog signals into digital signals processed by CPU 36 in accordance with the invention.

CPU 36 may be configured with a suitable memory unit 38 for storing a variety of different data including, for example, data tables containing calibration sample data, programmed computer statements which enable a computer system to act in accordance with the invention, and other similar types of data. The memory unit can be any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage types. If desired, the system may be configured with display 40.

It is often useful to know or ascertain the relative spatial relationship between sense coil 14 and a top surface of substrate 22 during various stages of operation. To accomplish such measurements, any of a variety of suitable proximity sensors may be implemented. As depicted in FIG. 1, a proximity sensor may be configured as capacitance sensor 18. In this implementation, the capacitance sensor may be configured to produce a predetermined voltage in the presence of interference or interruption in charge path. In operation, as the capacitance sensor approaches contact with the substrate, the charge may experience interference and produce a voltage drop. A specific or desired distance may be obtained or maintained by identifying a particular voltage output generated by the capacitance sensor.

Although the capacitance sensor may be implemented in some embodiments, the invention is not so limited and any of a variety of conventional proximity sensors may be used including, for example, optical lasers, Hall effect sensors, thermal IR sensors, ultrasound, and the like. Furthermore, it is not required that an implemented proximity sensor be configured within eddy current probe 12 and that other configurations are possible. For example, a proximity sensor may be configured on the outside of the eddy current probe or on some adjacent structure such as a probe support, as will be described in more detail in the following figures. Accordingly, the proximity sensor may be configured in almost any location as long as the relative distance between the sense coil and the substrate surface can be ascertained or maintained.

Distance 42 represents the relative distance between sense coil 14 and the surface of substrate 22 where a desired magnitude of eddy current signals may be obtained during an initial measuring process. A particular implementation may be where distance 42 is about 75 microns, which may be indicated by an output of 5 volts, for example, from capacitance sensor 18.

An eddy current measuring system may be implemented in a variety of applications where thickness measurements of conductive layers is required or desired. Typical applications include, for example, semiconductor fabrication, aerospace industries, metallurgic research and develop environments, jewelry manufacturing, and the like. As a matter of convenience, various embodiments of an eddy current measuring system for performing thickness measurements will be described in the context of a typical semiconductor fabrication environment. However, it is to be understood that the invention is not so limited and that many other applications are envisioned and possible within the teachings of this invention.

In a generalized example, substrate 22 may be formed as a semiconductor wafer having a conductive top layer 26. For example, the substrate may be a doped or an undoped silicon substrate or a substrate upon which one or more layers of conducting and/or non-conducting underlying films have already been formed and patterned into gates, wires or interconnects in a multi-level structure. The conductive top layer may be formed using any of a variety of different deposition processes such as electrochemical process (ECP), chemical vapor deposition (CVD), physical vapor deposition (PVD), plasma enhanced CVD (PECVD), low pressure CVD (LPCVD), rapid thermal CVD (RTCVD), atmospheric pressure CVD (APCVD), and the like.

The term "calibration sample" will be used herein to denote a specific type of substrate, and in particular, a substrate having a conductive top layer of known thickness. The term "substrate sample" is used herein to refer to a substrate having a conductive top layer of unknown thickness formed using known semiconductor fabrication processes.

In accordance with many embodiments of the invention, the eddy current measuring system shown in FIG. 1 may be used to measure the thickness and sheet resistance of a conductive top layer disposed on semiconductor wafer products. To accomplish such measurements, it is typically necessary to first measure calibration samples having conductive top layers of known thicknesses using a calibration process. Typically, an assortment of calibration samples having metal layers of varying thickness are used during a calibration process. By way of example, calibration samples A, B, C, D, and E will be used herein to define five such calibration samples having a conductive top-layer fabricated with a calibration metal measuring 50,000, 100,000, 150,000, 170,000, and 200,000 Å, respectively. The various calibration metals that may be used include, for example, Ti 6-4, Al, Ni, Ni-alloy, stainless steel (300 Series), and combinations thereof. Although each of a plurality of calibration samples may each include conductive top layers of varying thicknesses, this is not essential or critical and one or more calibration samples having a range of top layer thicknesses may be used, if desired.

As will be described in detail herein, calibration measurements obtained from calibration samples may be correlated to eddy current measurements obtained from a substrate having a conductive top layer of unknown thickness. In some implementations, the invention may be configured to obtain measurements from substrates having conductive top layers comprising conductive films typically used in the formation of multi-level interconnect structures including Cu, Cr, W, Al, Ta, TiN, and combinations thereof.

Usually, the conductive top layers of the calibration and substrate sample comprise different types of conductive materials, but this is not required. One reason for implementing different conductive materials in these samples is the aforementioned difficulty in measuring metal layers less than 10,000 Å, for example. As such, many embodiments utilize calibration samples having top layers of a lower conductivity than that present in a top layer of a substrate sample.

By way of example only, reference will be made to calibration samples comprising a top layer formed from a relatively lower conductive material of annealed Ti 6-4, and substrate samples comprising a top layer formed from the relatively higher conductive material, annealed copper. Based upon the well established International Annealed Copper Standard (IACS), the conductivity of annealed copper is the standard by which all other electrical conductors are compared. According to this standard, the conductivity of annealed copper measures 100 IACS, while the lower conductive material of annealed Ti 6-4 is measured as a fractional percentage (1/100) of annealed copper.

Utilizing this known relationship, the conductivity of a particular thickness of annealed copper is equal to a layer of Ti 6-4 that is 100 times thicker than the annealed copper. One example of this principal is illustrated by noting that the conductivity of a 1,000 Å layer of annealed copper is equal to the conductivity of a 100,000 Å layer of Ti 6-4, as shown in the following equation:

$$100*1,000 \text{ Å} = 100,000 \text{ Å}. \qquad \text{Eq. 1}$$

In accordance with some embodiments, measurement of calibration samples having top layers of known thicknesses of Ti 6-4 may be used in determining the thickness of a copper top layer of a semiconductor wafer product utilizing the above-described conductive relationship between these materials. And as will be described in detail herein, the calibration of an eddy current measuring probe for measuring micro-thin copper layers, for example, can be accomplished using a proportionately thicker layer of material such as Ti 6-4. It is also to be understood that the proportional conductive relationship described with respect to Ti 6-4 and annealed copper apply to situations involving any of the aforementioned conductive materials that may be used to form the calibration or substrate samples.

To illustrate the conductive relationship between conductive top layers of calibration and substrate samples of the invention, the following is presented.

$$\rho = 172.41/\sigma \qquad \text{Eq. 2}$$

Where $\rho$ denotes resistivity and $\sigma$ defines conductivity in IACS units.

$$\rho = \text{Thickness} \times \text{Sheet resistance} = t \times R(s) \qquad \text{Eq. 3}$$

Where t denotes thickness and R(s) defines sheet resistance, thus providing the following equation:

$$R(s) = \rho/t \qquad \text{Eq. 4}$$

From this relationship, the following equations may be provided:

$$R(s)\text{copper} = \rho \text{ copper}/t \text{ copper} \qquad \text{Eq. 5}$$

$$R(s)\text{Ti-6-4} = \rho \text{ Ti 6-4}/t \text{ Ti 6-4} \qquad \text{Eq. 6}$$

Assume now a calibration sample having a Ti 6-4 top layer that measures 100,000 Å, and a measuring sample having a copper top layer that is 1,000 Å. Substituting these values into the appropriate above-two equations provides the following.

With regard to the copper top layer of the substrate sample:

$$\begin{aligned} R(s) \text{ cooper} &= (171.41/\sigma)/1,000 \text{ Å} \\ &= (171.41/100 \ IACS)/1,000 \text{ Å} \\ &= 171.41/100,000 \text{ Å}(IACS). \end{aligned} \qquad \text{Eq. 7}$$

With regard to the Ti 6-4 top layer of the calibration sample:

$$\begin{aligned} R(s) \text{ Ti6} - 4 &= (171.41/1 \ IACS)/100,000 \text{ Å} \\ &= 171.41/100,000 \text{ Å} \ (IACS). \end{aligned} \qquad \text{Eq. 8}$$

Accordingly, it is demonstrated that:

$$R(s)\text{copper} = R(s)\text{Ti 6-4} \qquad \text{Eq. 9}$$

when the Ti 6-4 layer measures 100,000 Å, and the copper layer measures 1,000 Å.

Knowledge of electrical behavior, in terms of equivalent sheet resistance, of materials comprising the calibration and substrate samples permit the use of calibration samples having metal layers (Ti 6-4) that are 100 times thicker than copper layers formed on substrate samples.

By way of specific example, calibration samples may include conductive top layers formed from Ti 6-4 having a range of thicknesses such as 10,000, 20,000, 30,000, 40,000, 50,000, 60,000, 70,000, 80,000, 90,000, or 100,000 Å. Using the previously described conductivity relationship between Ti 6-4 and annealed copper, each of the just-described Ti 6-4 layer thicknesses may be used to represent a specific eddy current response of a substrate sample comprising a top layer formed with annealed copper having a thickness of, respectively, 100, 200, 300, 400, 500, 600, 700, 800, 900, and 1,000 Å. Accordingly, the measurement of a substrate sample having a micro-thin copper top layer of unknown thickness disposed upon its surface can be accomplished using calibration samples having a correspondingly thicker top layer of Ti 6-4 (100 times thicker).

Selection of specific frequency, gain, and voltage drive levels may be used to obtain a maximum magnitude eddy current signal response, while retaining an ability to determine phase separation at different thicknesses (for example, 500 Å and 1,000 Å). For a given conductive material, such as copper, a calibration sample comprising a corresponding thicker layer of Ti 6-4 may be utilized (as described above).

In operation, AC voltage 28 may introduce pre-selected sinusoidal waves at a suitable frequency to Wheatstone bridge 30. In some implementations, adjustable electronic bridge circuit 32 may be applied to the Wheatstone bridge to balance the circuit and zero the reference voltage. At this point, controller 20 may translate eddy current sense coil 14 until the coil approaches contact with the surface of substrate 22, as indicated by distance 42, at which point the Wheatstone bridge unbalances its voltage between legs. This voltage may be measured, detecting the amplitude of the in-phase component (X) as well as the quadrature component (Y). As used herein, X voltage values represent resistance, while the Y voltage values represent reactance.

Figure 2:
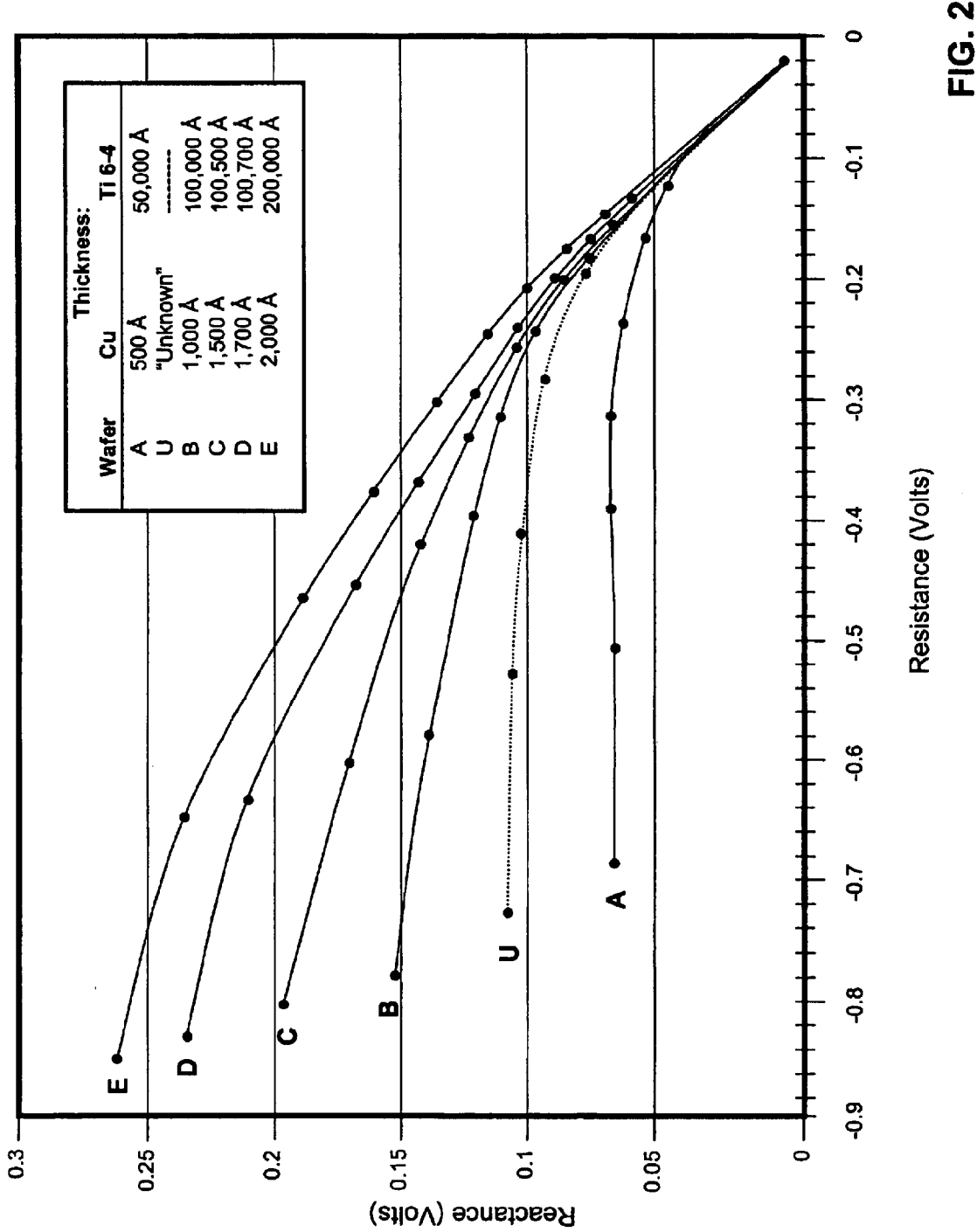
FIG. 2 is a graph showing two-point lift-off curves relating to eddy current measurements taken from calibration and substrate samples having, respectively, conductive top layers of known and unknown thicknesses.

FIG. 2 is a graph showing two-point lift-off curves relating to eddy current measurements taken from calibration and substrate sample having, respectively, known and unknown thicknesses. This graph will be described with reference to the eddy current measuring system shown in FIG. 1.

As previously described, many embodiments utilize the known conductive relationship between conductive materials forming the top layers of the calibration and substrate samples. Based upon this known conductive relationship, curves representing eddy current measurements obtained from calibration samples comprising top layers formed from variably thick layers of Ti 6-4 may be correlated to substrate samples comprising top layers formed from relatively thinner layers of annealed copper.

For example, eddy current measurements obtained from calibration sample A (comprising a 50,000 Å top layer of Ti 6-4) may be substantially identical to eddy current measurements obtained from a substrate comprising a 500 Å top layer of annealed copper. This relationship holds true for each of the remaining curves B through E. For instance, eddy current measurements obtained from calibration samples B, C, D, and E (respectively comprising 100,000 Å, 150,000 Å, 170,000 Å, and 200,000 Å top layers of Ti 6-4) are respectively identical to eddy current measurements obtained from samples comprising top layers of annealed copper measuring 500 Å, 1,000 Å, 1,500 Å, 1,700 Å, and 2,000 Å.

Accordingly, curves representing eddy current measurements obtained from calibration samples comprising Ti 6-4 top layers of variable thickness are identical to curves representing eddy current measurements obtained from samples comprising top layers formed from annealed copper that are of a thickness that is 1/100 of that of the Ti 6-4 layers.

Referring still to FIG. 2, curves A through E each include initial data values (X,Y) that are illustrated on the left side of this graph, and which eventually terminate near the bottom right of this graph (0,0). In general, the system may obtain two distinct sets of resistance and reactance values, referred to herein as initial and terminating resistance and reactance measurements. The initial resistance and reactance measurements are typically obtained when the eddy current sense coil is positioned an initial distance 42 relative to the substrate surface.

Terminating resistance and reactance measurements, on the other hand, may be obtained after increasing (or decreasing) the relative distance between the eddy current sense coil and the substrate surface. This increase or decrease in distance will be referred to herein as an incremental distance. Initial distance 42 may be any distance that permits the detection of sufficiently strong eddy current signals, while the incremental distance may be any distance that allows the detection of initial and terminating measurements representing two discrete values. In some instances, this may be accomplished by implementing an incremental distance of a few microns, and in other cases, an incremental distance of 20–40 microns, or more, may be required.

A particular example may be where the initial distance is about 75 microns, and the incremental distance is about 15–20 microns. Accordingly, in this situation, the terminating resistance and reactance measurements may be obtained when the relative distance between the eddy current sense coil and the substrate surface is about 90–95 microns.

A possible variation on this aspect may be where terminating resistance and reactance measurements are obtained after decreasing the relative distance between the eddy current sense coil and the surface of the substrate. In this particular implementation, it is typically necessary that initial distance 42 is such that the eddy current probe does not contact the substrate measurements when making the terminating measurements.

A specific example of obtaining eddy current measurements from an assortment of calibration samples comprising variably thick top layers of conductive materials will now be described. Referring still to FIG. 2, curve A denotes eddy current measurements that may be obtained from calibration sample A comprising a 50,000 Å top layer of Ti 6-4. Curve A is shown having initial resistance and reactance values (X,Y) of about −0.7 volts and 0.07 volts, respectively. These initial resistance and reactance values may be obtained while eddy current sense coil 14 is positioned at a particular or desired initial distance 42 relative to the surface of the calibration sample.

Curve A further includes a series of additional eddy current measurements that ultimately terminate in resistance and reactance values (X,Y) near 0,0; thus indicating a measurement of near zero resistance and reactance voltages. These terminating resistance and reactance voltage values (X,Y) define eddy current measurements obtained when sense coil 14 and the surface of calibration sample A are separated by such a distance that no eddy current signal is detected. These terminating values will also be referred to herein as "eddy current on air." It is to be understood that terminating values are often obtained using eddy current on air values since these types of signals are easily identified.

However, the invention is not so limited and any incremental distance may be used as long as it permits the measuring of initial and terminating values having two discrete values.

Eddy current on air values may be obtained by increasing the relative distance between sense coil 14 and the surface of the calibration sample until no eddy current signal is detected. Increasing the relative distance between these elements may be accomplished by retracting eddy current probe 12 and included components (sense and reference coils 4 and 6; capacitance sensor 18) from the calibration sample. Additionally or alternatively, the calibration sample may be translated relative to the eddy current probe.

Curves B through E may be generated in a similar manner. For instance, curves B, C, D, and E illustrate eddy current measurements that may be obtained from calibration samples comprising top layers formed from Ti 6-4 of variable thickness (100,000 Å, 150,000 Å, 170,000 Å, and 200,00 Å), and are respectively identical to measurements that may be obtained from a substrate sample comprising top layers of annealed copper measuring 1,000 Å, 1,500 Å, 1,700 Å, and 2,000 Å.

Initial resistance and reactance values (X,Y) for each curve B through E may also be obtained by positioning eddy current sense coil 14 at initial distance 42. Curves B through E also include a series of additional measurements that ultimately terminate in resistance and reactance values (X,Y) near 0,0. Curve U is associated with a non-calibration sample, and will be described in more detail in conjunction with later figures.

A calibration operation has been described using five distinct calibration samples having conductive top layers of variable thickness. Although no particular number calibration samples are required or essential, it is typically necessary to have at least two calibration samples of different thicknesses to provide a basis for thickness estimation. Alternatively, one or more calibration samples providing a range of top layer thicknesses may also be used. Regardless of the calibration sample configuration, each of the initial resistance and reactance values (X,Y) for each of the curves A through E may be used as the basis for the generation of a natural intercepting curve, as will now be described.

Natural Intercepting Curve

Figure 3:
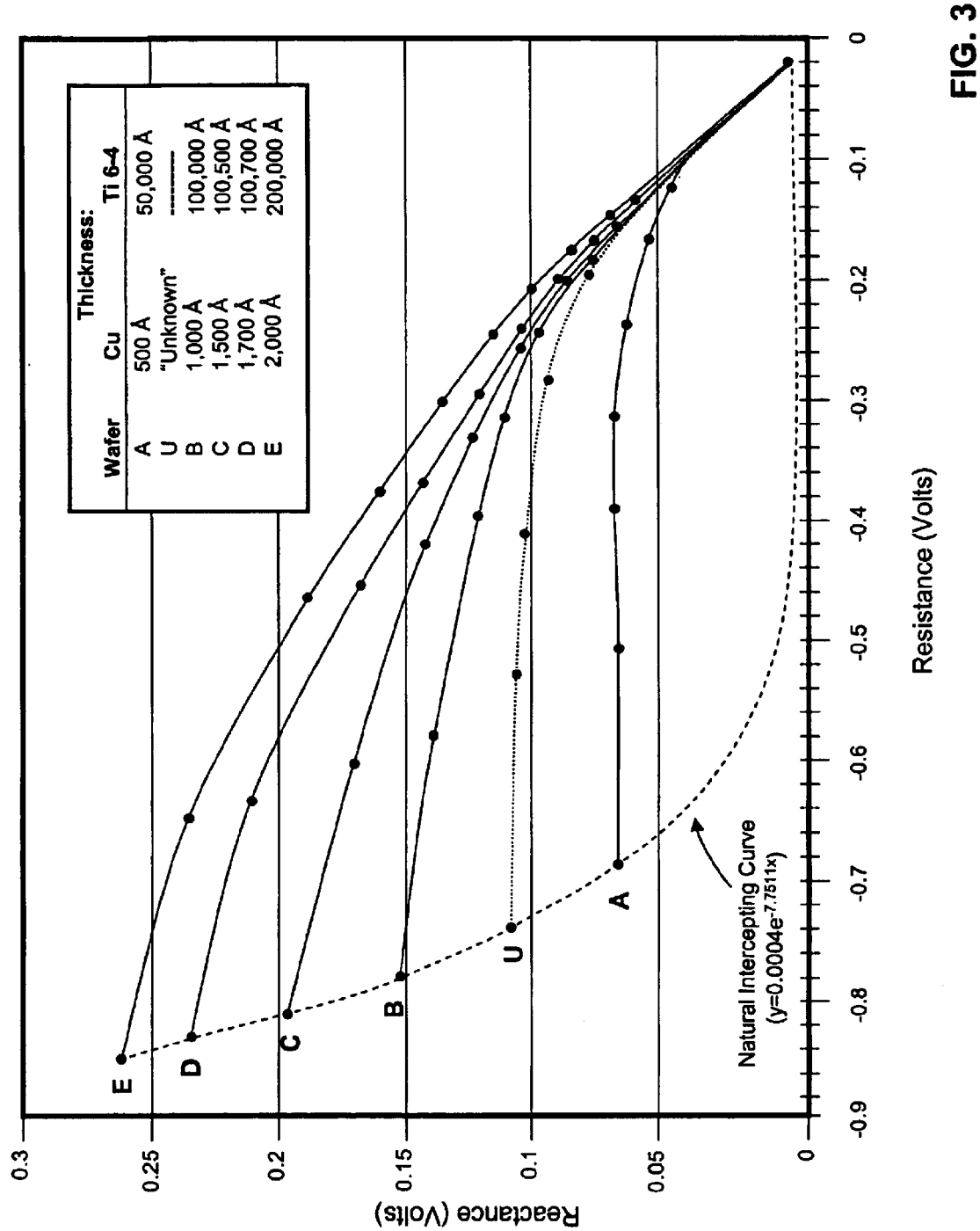
FIG. 3 is a graph showing the formation of a natural intercepting curve defined by initial resistance and reactance values for calibration sample curves A through E.

FIG. 3 is a graph showing one method for forming a natural intercepting curve based upon initial resistance and reactance values (X,Y) of curves A through E.

The natural intercepting curve may be generated using known curve-fitting methods, and may be represented in general form by the following equation:

$$Y = me^{-nX}.\qquad\text{Eq. 10}$$

The m and n coefficients may be calculated by substituting the initial resistance and reactance values (X, Y) for a particular curve into this equation.

In another calculation, a linear equation may be generated for a particular curve based upon two data points; namely, the initial resistance and reactance values (X,Y) and the terminating resistance and reactance values (X,Y). For example, a first data point may be obtained while eddy current sense coil 14 is positioned at initial distance 42 relative to the surface of the calibration sample; and a second data point may be obtained by increasing (or decreasing) the relative distance between these two objects.

The first and second data points may then be used to generate a linear equation such as the following:

$$Y = aX + b.\qquad\text{Eq. 11}$$

Where 'a' defines slope and 'b' denotes the offset value present during data collection resulting from thermal drift or from measuring differences that may occur when different eddy current probes are used for measuring the calibration and inspection samples. The collection of these two data points is typically less than 1 second, and in come cases, data collection requires less than 0.3 seconds per data point. Coefficients 'a' and 'b' can be calculated by substituting the value of the (X,Y) voltage pair into the equation.

To eliminate the effects of thermal drift and eddy current probe measuring differences, the 'b' coefficient may be eliminated, resulting in the following equation:

$$Y = aX\qquad\text{Eq. 12}$$

which will be referred to herein an "intersecting line." Eliminating the 'b' coefficient helps assure that the intersecting line is brought back to the original coordinates of the impedance plane (0,0). Intersecting line equations may be generated for each of the calibration samples A through E, resulting in calibration sample intersecting lines A, B, C, D, and E, respectively.

Intersection Point

In another calculation, the intersection point of a calibration sample intersecting line and the natural intercepting curve may be determined. This calculation is performed for each of the calibration samples A through E, resulting in calibration sample intersection points A, B, C, D, and E, respectively.

The calculation of these intersection points may be accomplished by equating the natural intercepting curve and one of the above-generated calibration sample intersecting line equations, as illustrated in the following equation:

$$me^{-nX} = aX.\qquad\text{Eq. 13}$$

A calculated intersection point may have coordinates (X,Y). The Y coordinate in the generated intersection point denotes reactance (volts) and will be used as a Y coordinate in forming the digital calibration thickness curve, as will now be described.

Digital Calibration Curve

Figure 4:
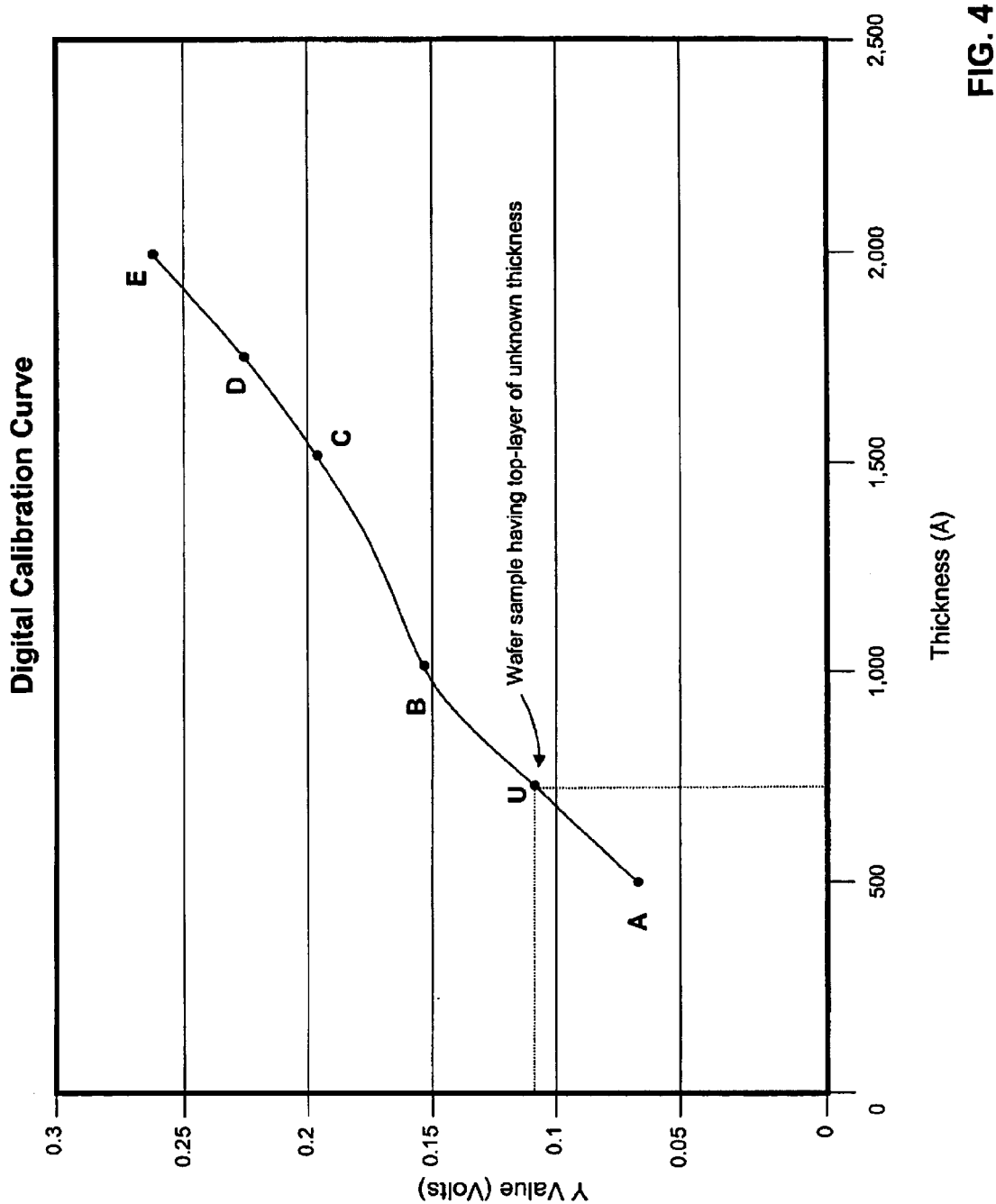
FIG. 4 is a graph showing a digital calibration curve that may be generated by data associated with calibration samples A through E.

FIG. 4 is a graph showing a digital calibration curve generated by data associated with calibration samples A through E. In this graph, the X coordinate denotes the thickness of the various calibration samples (500 Å–2,000 Å) which again have been obtained from the correspondingly thicker layers of Ti 6-4, while the Y coordinate denotes reactance (volts) of the previously generated calibration sample intersection point.

For example, point A represents the top layer thickness and associated reactance value for calibration sample A. Specifically, point A represents a calibration sample A having a copper top layer of about 500 Å and a reactance value of about 0.07 volts. Similarly, calibration samples B, C, D, and E represent calibration samples having, respectively, copper top layers measuring about 1,000 Å, 1,500 Å, 1,700 Å, and 2,000 Å; and associated reactance values of about 0.152, 0.21, 0.23, and 0.27 volts.

In many embodiments, a digital calibration curve provides the basis for determining the thickness of conductive top layers formed on a given substrate such as a semiconductor wafer product. While conventional systems require continuous or periodic recalibration to correct thermal drift, for example, the present invention typically does not require any such recalibration. Typically, once the digital calibration curve has been formed, no further calibration processes are necessary.

Measure Thickness of Conductive Top Layer

Figure 5:
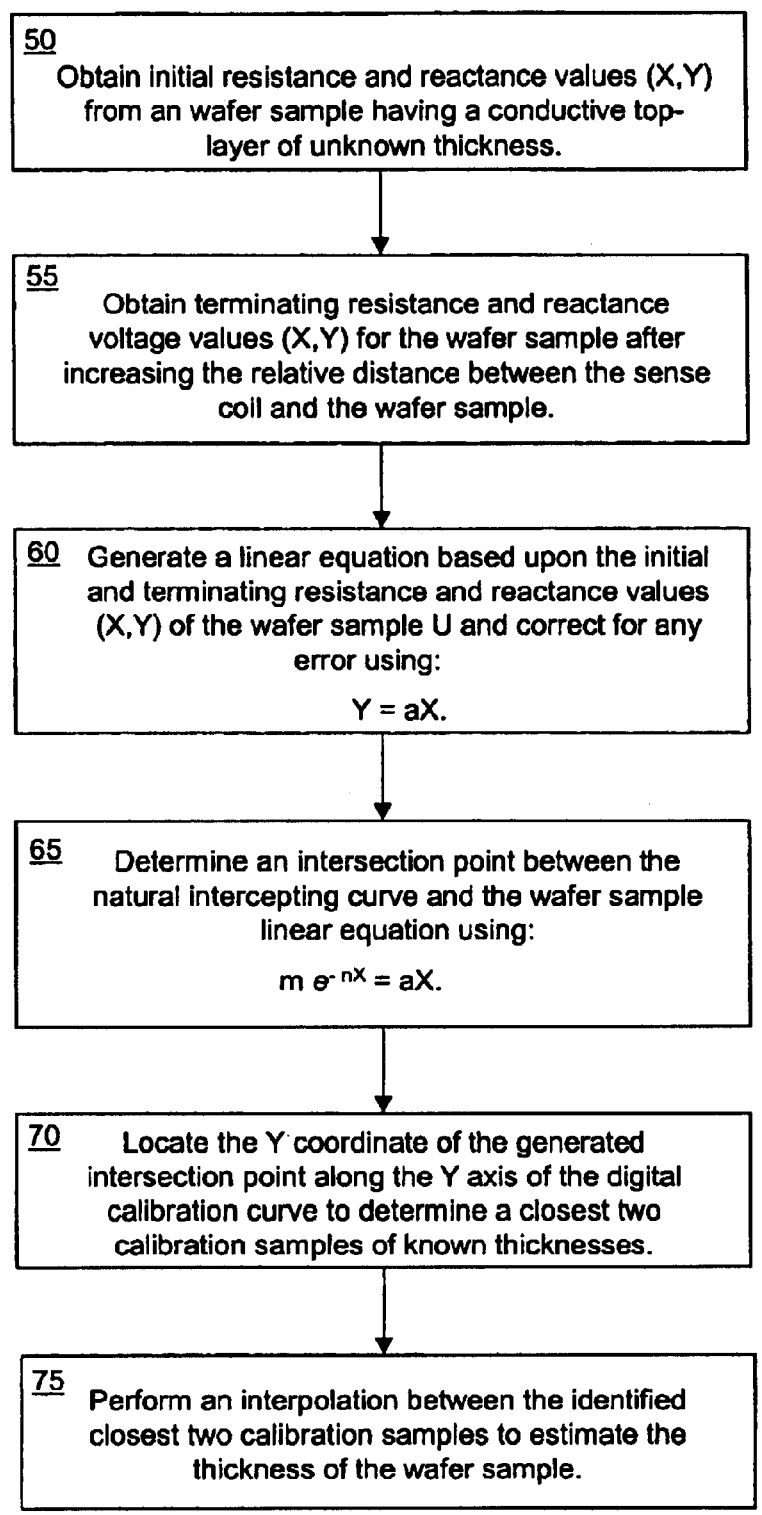
FIG. 5 is a flowchart showing exemplary operations for one of a variety of different methods for estimating the thickness of a conductive top layer of a substrate.

FIG. 5 is a flowchart showing one of a variety of different methods for estimating the thickness of a conductive top layer of a substrate sample, and will be described with reference to the eddy current measuring system shown in FIG. 1, as well as the graphs shown in FIGS. 2–4. It is to be understood that at some point prior to thickness estimation, a digital calibration curve (FIG. 4) has been previously generated by obtaining measurements from one or more calibration samples (described above).

As indicated in block 50, eddy current sense coil 14 may be initially positioned at initial distance 42 relative to the surface of substrate sample U. At this point, initial resistance and reactance values (X,Y) of the substrate sample U may be obtained.

Next, the relative distance between the sense coil and the substrate sample U may be increased (or decreased) an incremental distance so that terminating resistance and reactance voltage values (X,Y) may be obtained (Block 55). Curve U in FIG. 3 provides an example of initial and terminating resistance and reactance values (X,Y) for the substrate sample U.

In block 60, the initial and terminating resistance and reactance values (X,Y) of the substrate sample U may be used in the following equation:

$$Y=aX+b. \quad \text{Eq. 14}$$

In many instances, the 'b' coefficient may be eliminated to correct for thermal drift and eddy current probe measuring differences, resulting in the following equation:

$$Y=aX. \quad \text{Eq. 15}$$

This equation is referred to herein as intersecting line U.

As shown in block 65, the intersection point between the natural intercepting curve and the wafer substrate intersecting line U may be determined by the following equation:

$$me^{-nX}=aX. \quad \text{Equ. 16}$$

The generated intersection point may have a coordinate of (X,Y). Significantly, the Y value in the generated intersection point coordinates denotes reactance (volts) of the intersection point. In block 70, this Y value is located along the Y axis of the previously generated digital calibration curve (FIG. 4) so that the closest-two calibration samples of known thickness may be determined or ascertained.

For example, the Y coordinate associated with the substrate sample U will typically fall within the Y coordinates of two distinct calibration samples. As shown in FIG. 4, the Y coordinate of the generated substrate sample intersection point falls between two calibration samples (A and B), thus indicating that the top layer thickness of the substrate sample U measures between 500 Å and 1,000 Å.

As indicated in block 75, the top layer thickness of the substrate sample U may be more precisely determined by performing linear or non-linear calculations. For example, an appropriate linear calculation may be accomplished by performing an interpolation between the appropriate two calibration samples (for example, calibration samples A and B). On the other hand, a non-linear calculation may be implemented by curve-fitting the Y coordinate associated with the substrate sample U to the curve defined by the appropriate two calibrations samples.

Figure 6:
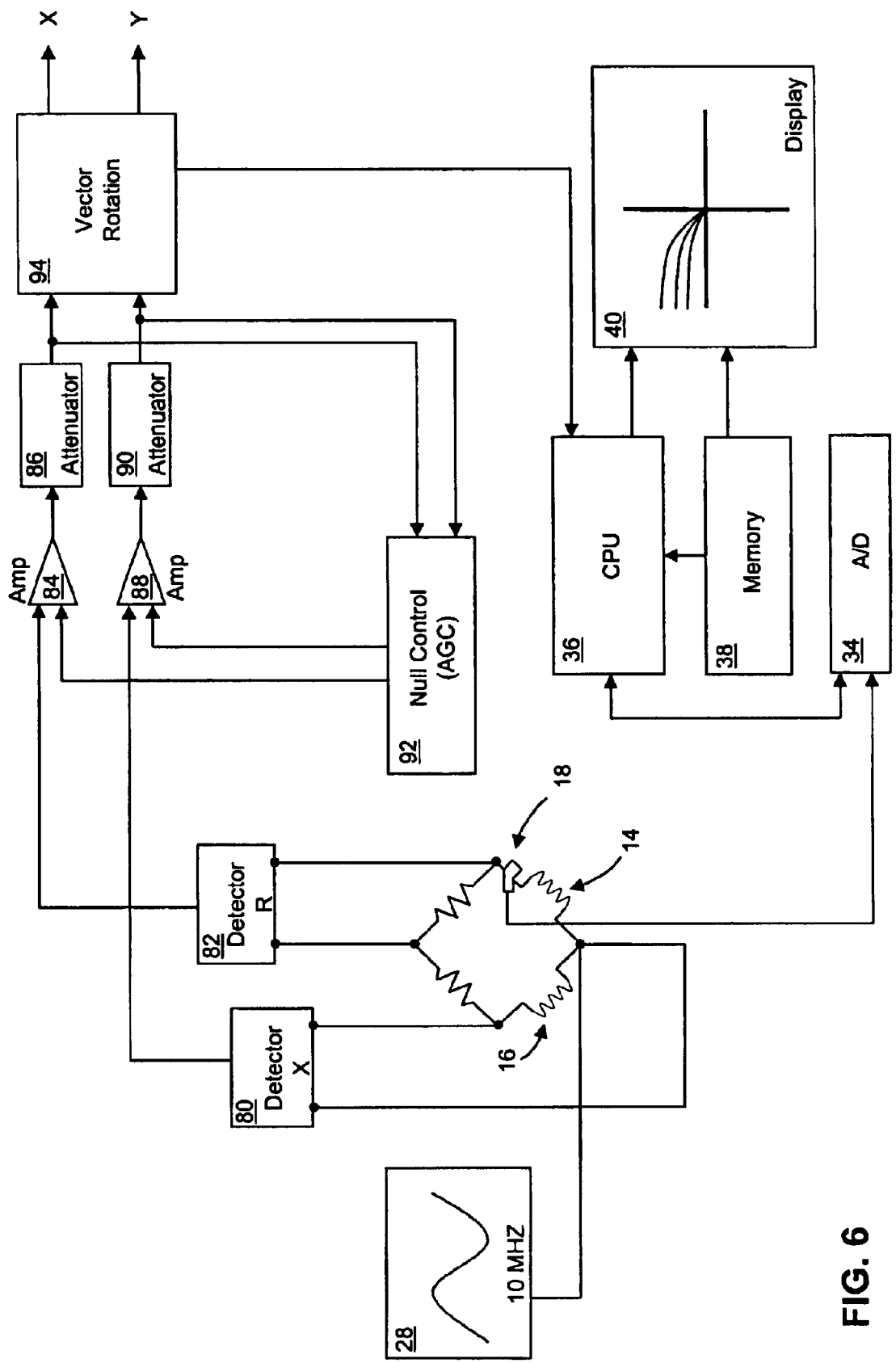
FIG. 6 is a diagram showing an eddy current measuring system in accordance with an alternative embodiment of the invention.

FIG. 6 is a diagram showing an eddy current measuring system according to an alternative embodiment of the present invention. In this figure, AC voltage source 28 is in electrical communication with sense coil 14, reference coil 16, as well as capacitance probe 18. In this embodiment, reactance and resistance may be detected by reactance detector 80 and resistance detector 82, respectively. A detected signal may be amplified utilizing an automatic gain control circuit, denoted by reference numbers 84, 86, 88, 90, and 92. Vector rotation 94 may be utilized to rotate the signal so that an appropriate graphical presentation may be presented at optional display 40. CPU 36 and memory 38 may operate in the same manner as the eddy current measuring system shown in FIG. 1.

Figure 7:
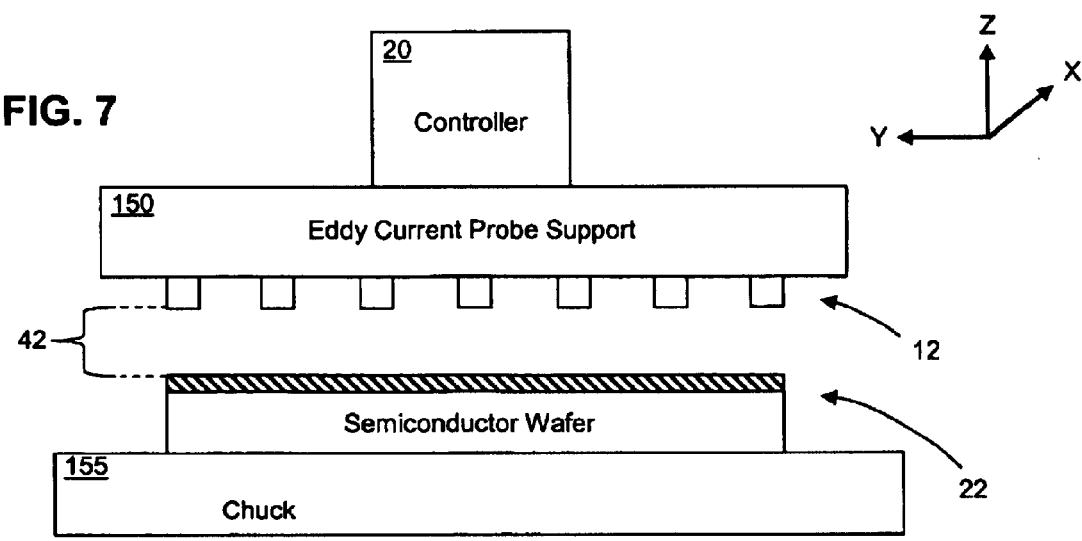
FIG. 7 is a side view showing several components of an eddy current measuring system in accordance with the invention.
Figure 8:
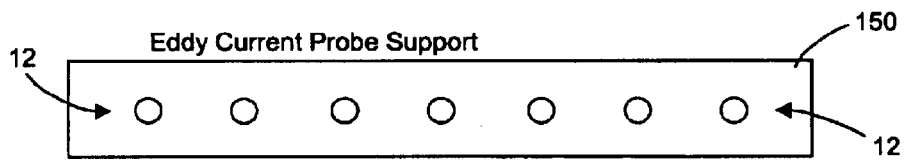
FIG. 8 provides a bottom view of the eddy current probe support of FIG. 7.

FIG. 7 is a side view showing several components of an eddy current measuring system in accordance with the invention. In this particular embodiment, controller 20 is coupled with eddy current probe support 150 containing a linear array of individual eddy current probes 12. FIG. 8 provides a bottom view of the eddy current support and associated array of individual eddy current probes.

In operation, substrate 22 may be securely positioned using a suitable wafer securing device such as a conventional wafer chuck 155. Typically, the chuck includes a vacuum or other suitable securing device for stabilizing the substrate during the thickness measuring process.

Implementing an array of multiple eddy current probes is particularly useful for simultaneous inspection or monitoring of thicknesses of multiple locations of the substrate. Although seven separate eddy current probes are shown, additional or fewer probes may be implemented as may be desired or required. For example, it is contemplated that the number of eddy current probes may range anywhere from a single probe, to as many as 25–30 probes, or more. Other variations may be to stagger or offset an array of multiple probes along the bottom side of probe support 150 in non-linear fashion. In addition, the use of multiple probe supports containing one or more eddy current probes may also be used. Examples of various multiple probe support embodiments that may be implemented include arranging the probe supports in parallel fashion, or at some angular orientation relative to one another.

Figure 9:
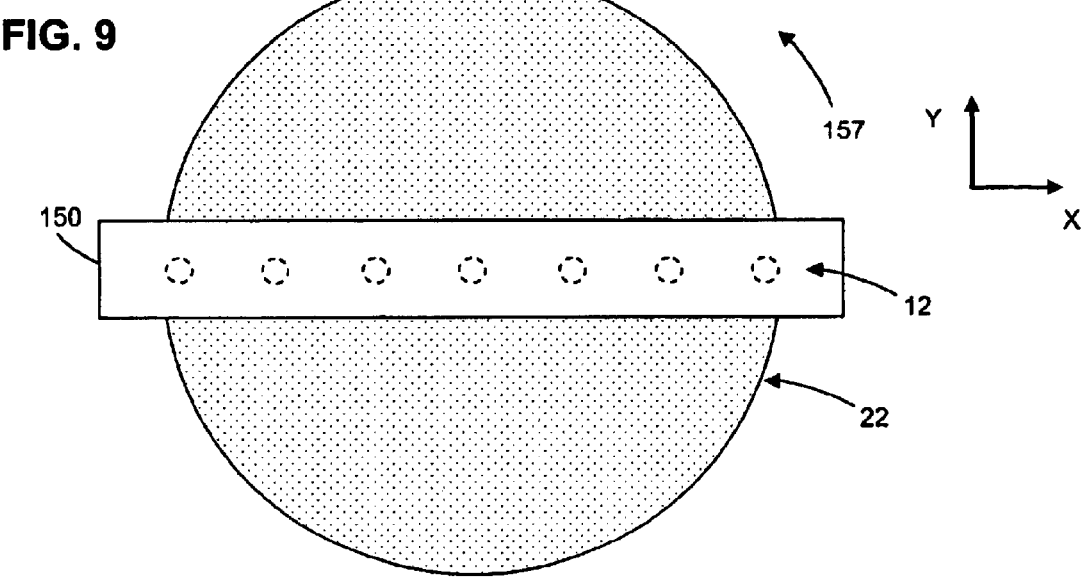
FIG. 9 is a top view of the eddy current probe support of FIG. 7 positioned over a substrate.

FIG. 9 is a top view of eddy current probe support 12 positioned over substrate 22. Thickness measurements of the substrate sample may be accomplished by providing relative motion between the substrate and eddy current probes 12 so that initial and terminating measurements may be obtained. One particular example may be where the probe support and associated array of eddy current probes is rotated in direction 157.

Another example may be where the substrate is rotated relative to the eddy current probes. This may be accomplished by removing the substrate from its position on chuck 155, rotating the substrate a desired number of degrees, and repositioning the substrate on the chuck. Alternatively, the chuck may be configured with a suitable control device for rotating the substrate sample. Yet another variation may be where the eddy current probe support and the substrate sample are rotated relative to each other.

Linear measuring methods may also be implemented to supplement, or as alternative, to the just-described rotational measuring options. For instance, thickness measurements of a substrate may be accomplished by linearly translating the substrate, probe support, or both, in the X or Y direction.

Figure 10:
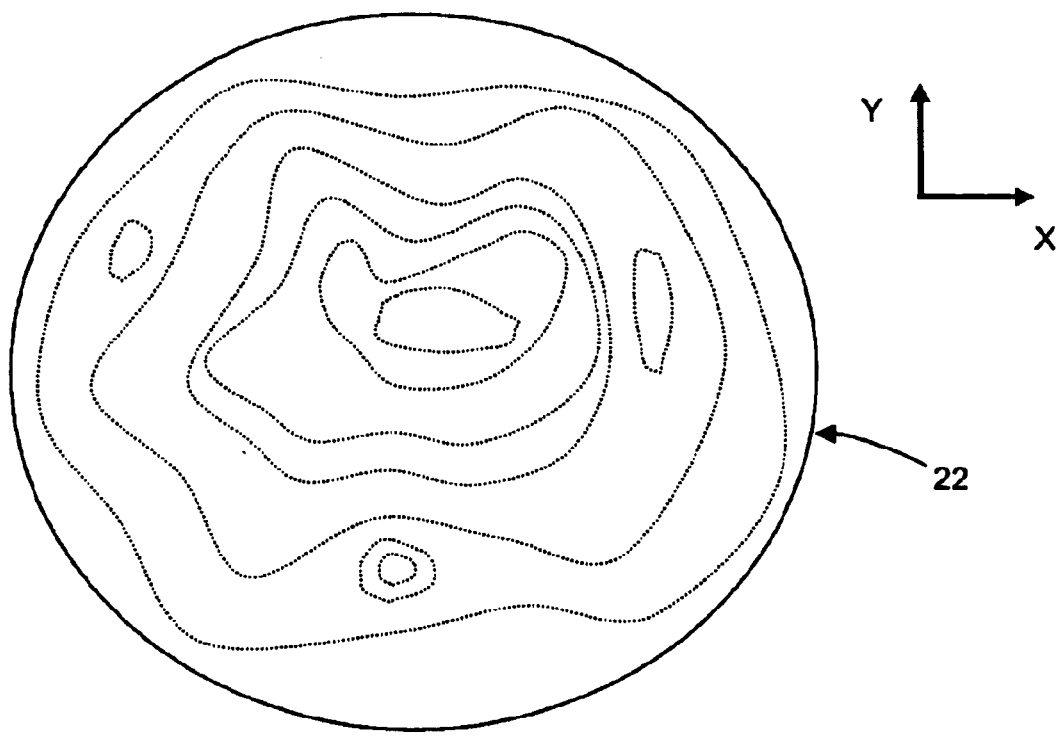
FIG. 10 is a three-dimensional contour map representing a thickness profile that may be obtained from a substrate in accordance with the invention.

FIG. 10 is a three-dimensional contour map representing a thickness profile that may be obtained from a substrate sample in accordance with the invention. In this figure, substrate sample 22 includes various elevations that may be associated with a particular thickness. Data necessary for generating the contour map may be obtained by scanning the substrate sample with one or more eddy current probes, and making the appropriate thickness measurement at discrete locations on the substrate sample using any of the methods described herein. For example, the substrate sample may be scanned in radial fashion starting at or near the center and progressing in an outward manner, or vice versa. Alternatively, an eddy current probe (or probes) may be raster scanned over the desired locations of the substrate.

Other possibilities include the use of multiple eddy current probes configured on an eddy current probe support 150, as depicted in FIGS. 7–9. Scanning the substrate sample to obtain a number of thickness measurements may be implemented using a rotational scanning method, a linear scanning method, or both.

Initially, regardless of the type of scanning method employed, the probe support containing a multiple array of eddy current probes may be positioned over a starting location of the substrate so that thickness measurements of these particular locations may be obtained.

In another operation, if a rotational method is utilized, the eddy current probe support, the substrate, or both, may be rotated a pre-determined number of degrees relative to one another. Upon doing so, the newly positioned eddy current probes may obtain thickness measurements of different locations of the substrate. These procedures may be repeated until all of the required thickness measurements have been made.

A particular example of a rotational scanning method may be where the probe support is rotated 10° relative to an underlying substrate sample. Upon the performance of this rotation operation, the array of eddy current probes can obtain measurements from different locations of the substrate. If this rotation operation is repeated seventeen times (10° increments) the eddy current probes will have been rotated a total of 170°, thus providing a complete scan of the substrate.

Of course, the incremental degree of rotation may be varied to accommodate a particular measuring requirement. For instance, a total of 179 rotations and corresponding measurements where a rotational increment of 1° is used may provide for an extremely accurate thickness profile of the substrate sample. On the other hand, where such a degree of accuracy is not essential, a single rotation of 90° and corresponding measurement may provide sufficient thickness data Using a linear translation method, the eddy current probe support and associated probes may be translated along the X and/or Y axes relative to the substrate. Upon doing so, the newly positioned eddy current probes may obtain thickness measurements of different locations of the sample. These procedures may be repeated until all of the required thickness measurements have been obtained.

Figure 11:
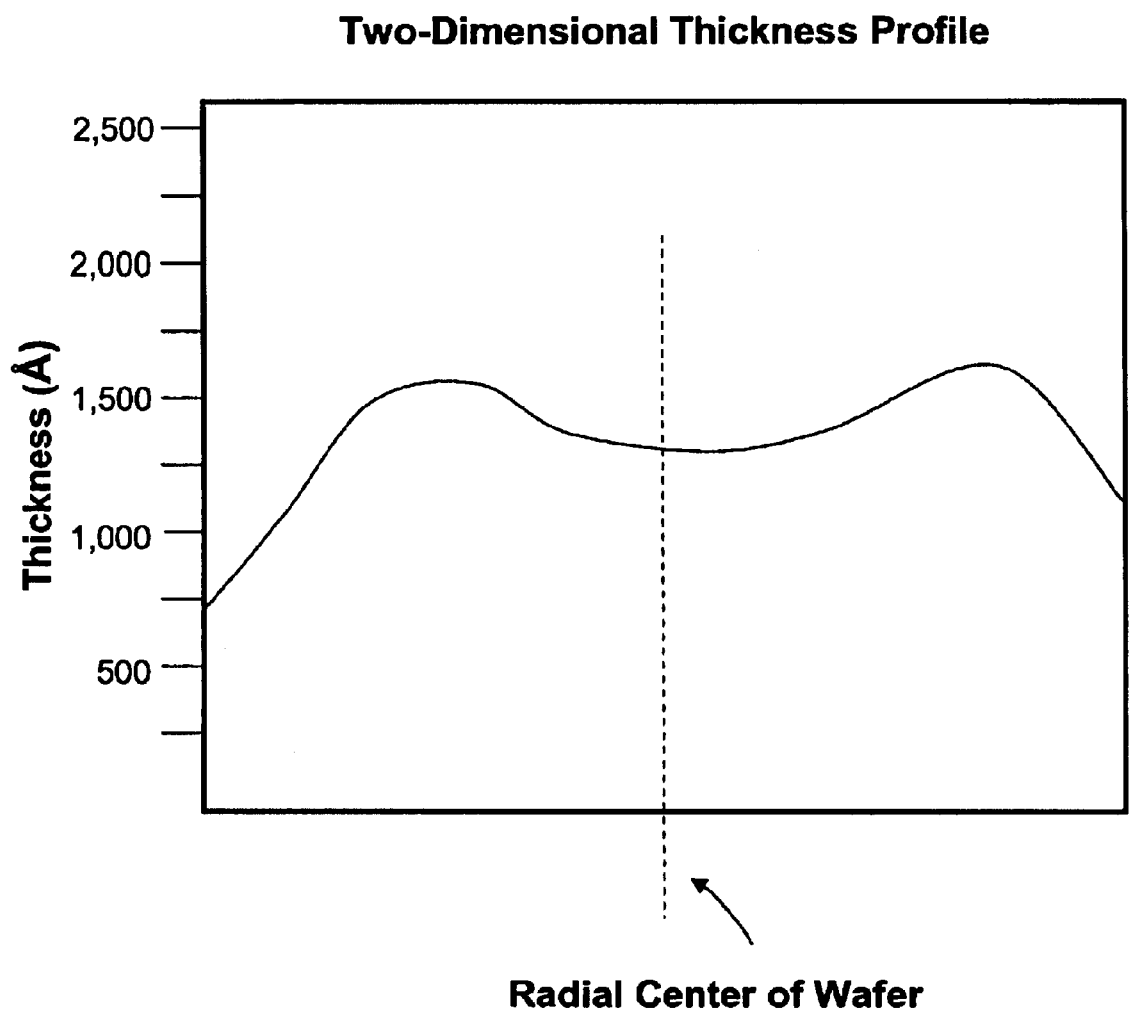
FIG. 11 is a graph representing a possible thickness profile that may be created by obtaining a plurality of thickness measurements over a diameter of a substrate.

FIG. 11 is a graph representing a possible thickness profile that may be created by obtaining a plurality of thickness measurements over a diameter (or other portion) of a substrate sample in accordance with the invention. In this graph, the bottom axis represents the diameter of substrate 22, while the radial center of the substrate is provided in dashed lines. The vertical axis denotes some of the possible top layer thickness of a substrate sample. Measurement data depicted in FIG. 11 may be obtained using any of the thickness measurement techniques described herein.

The left side of the graph indicates that the leftmost edge of a substrate sample has a thickness of about 750 Å. The thickness of the sample continues to rise to about 1,500 Å, where it then declines to about 1,250 Å at about the radial center of the sample. The thickness of the substrate again rises and then falls to about 1,000 Å near the right side of the substrate.

Knowledge of the top layer thickness of a substrate, which may be obtained using any of the various methods described herein, is useful in a range of applications. By way of example, an assortment of the many possible implementations of an eddy current measuring system will now be described.

In general, the illustrated embodiments may be characterized as an integrated or standalone eddy current measurement system (ECMS). An integrated ECMS may include a system that is integrated or tightly coupled with metal deposition, or metal layer removal systems present in conventional semiconductor wafer fabrication environments. Examples of the possible metal deposition systems and processes that may implement an ECMS include ECP, CVD, PVD, PECVD, LPCVD, RTCVD, APCVD systems, among others. A chemical mechanical polishing (CMP) system is one example of a metal layer removal system that may implement an integrated ECMS.

An example of an integrated ECMS may be where the ECMS is physically separated from an associated ECP system, for example, but were the ECMS communicates or provides thickness data to the ECP and/or a CMP system using some type of communication link (for example, UTP, network cabling, coaxial cables, serial or parallel cables, fiber optics, wireless link, among others). Another example, of an integrated system may be where the ECMS is physically separated from the ECP system, but the ECP system presents substrates to the ECMS using some type of mechanical device such as a robot or conveyor. Physically configuring some or all of an ECMS system with an ECP system may also constitute an integrated system.

A standalone ECMS system may be characterized as an ECMS that is not coupled in some manner to a particular metal deposition or metal layer removal system. In essence, a standalone system is a system that does not meet the requirements of an integrated system. In some implementations, as will be described in detail herein, a standalone system may operate as a functional tool within a complete semiconductor fabrication environment. In other embodiments, a standalone system may be employed to obtain thickness measurement data so that one or more discrete components of a semiconductor fabrication system may be monitored or controlled. Other applications include implementing the standalone ECMS as a table-top device, which has particular appeal to those working in research and development environments.

It is to be understood that the various ECMS systems depicted in the following figures may be may be fabricated using any of the eddy current measuring systems and methods disclosed herein. Furthermore, the various metal deposition and metal layer removal systems depicted in FIGS. 12–15 may be implemented using conventional semiconductor fabrication system components, but with modified tooling to accommodate and utilize an associated ECMS system.

For example, the various metal deposition systems, CVD 210, PVD 255, and ECP 260, may be implemented using any suitable system providing deposition of thin metallic films using standard and well known deposition processes. In general, a metal deposition process involves depositing a filler layer over a non-planar surface of a wafer, which is one particular example of a substrate sample. For example, a conductive filler layer may be deposited on a patterned insulated layer to fill the trenches or holes in the insulated layer.

Similarly, CMP 220 may be implemented using any suitable system providing metal layer removal, a specific example of which is a chemical-mechanical polishing (CMP) system. A wafer typically undergoes processing by a CMP system after a metal deposition process. The CMP system typically polishes the conductive layer until the raised pattern of the insulated layer is exposed. After planarization, the portions of the conductive layer remaining between the raised pattern of the insulated layer form vias, plugs and lines that provide conductive paths between thin film circuits on the substrate.

The CMP process typically requires the mounting of the wafer on a carrier or polishing head. The exposed surface of the wafer may be placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment media. The carrier head typically provides a controllable load on the substrate to push it against the polishing pad. Polishing slurry, including at least one chemically-reactive agent, and abrasive particles if a standard pad is used, is supplied to the surface of the polishing pad.

One problem in CMP is determining whether the polishing process is complete; that is, whether the top layer of the wafer has been planarized to a desired flatness or thickness, or when a desired amount of material has been removed. Overpolishing (removing too much) of a conductive top layer or film may lead to increased circuit resistance. On the other hand, under-polishing (removing too little) of a conductive top layer may lead to electrical shorting. Variations in the initial thickness of the top layer of a wafer may cause variations in the material removal rate. Accordingly, knowledge of top layer thickness of a wafer is particularly useful in the many systems involved in the semiconductor fabrication process.

Figure 12:
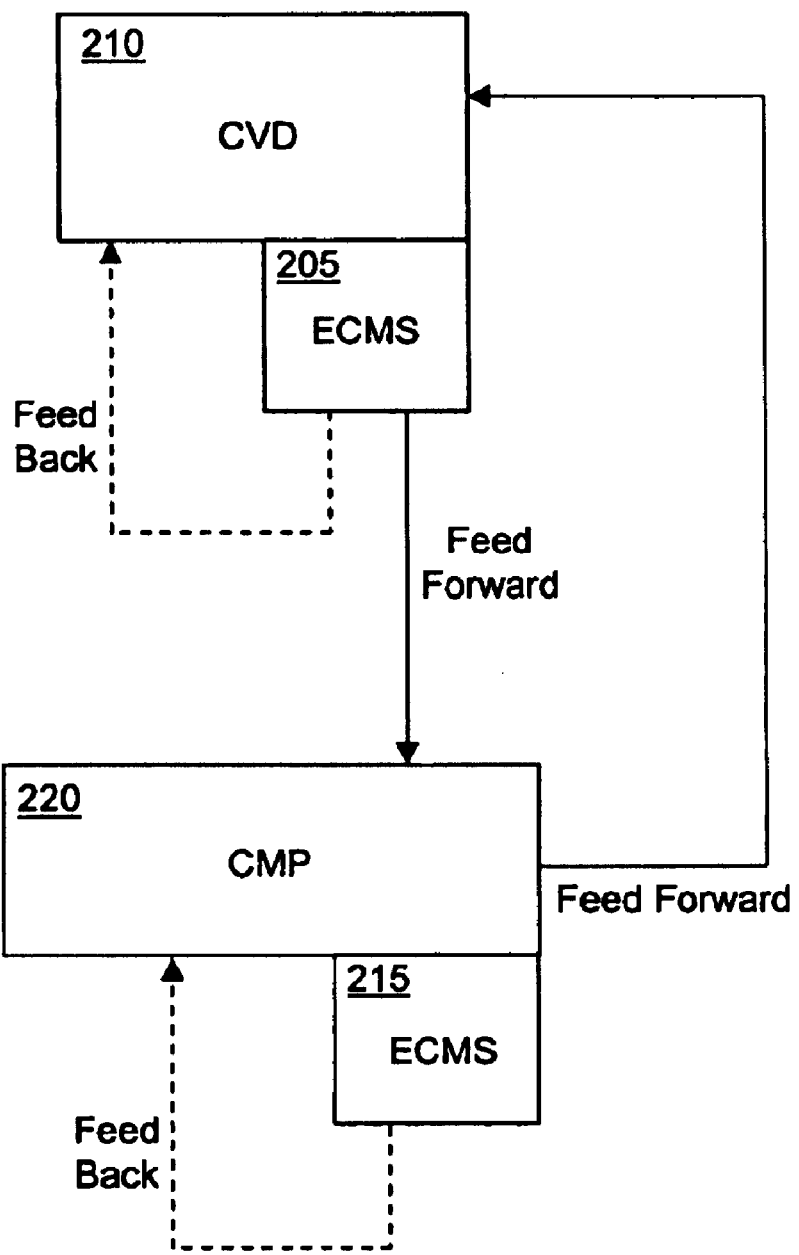
FIG. 12 is a block diagram showing an example of an integrated eddy current measuring system configured with CVD and CMP systems.

FIG. 12 is a block diagram showing an example of an integrated ECMS configured with CVD and CMP systems. In this figure, an ECMS 205 is integrated with CVD system 210, while ECMS 215 is configured with CMP system 220. In this arrangement, each ECMS system may communicate or provide thickness data in two distinct manners referred to herein as feed forward and feed back operations.

The CVD and CMP systems depicted in this figure represent a conventionally configured semiconductor fabrication setup, as modified to accommodate and utilize an associated ECMS system. A typical semiconductor fabrication process utilizing an ECMS system may proceed as follows.

First, the CVD system may process a batch of wafers resulting in the deposition of a top layer comprising, in many instances, copper or other conductive material. One or more of the processed batch of wafers may be presented to ECMS 205 for thickness measurements. Next, ECMS 205 may perform the required thickness measurements of the selected wafer or wafers, which typically takes a few seconds per wafer, and then provides the generated thickness data to the CVD system using a feed back operation. In this configuration, ECMS 205 provides near real-time process control or monitoring of the CVD metal deposition process. The CVD system may use this thickness data so that it can adjust its process parameters for processing subsequent batches of wafers. Typical process parameters for a CVD system include process time, current or voltage values, solution density, and the like.

As an alternative, or in addition to providing the feed back operation, ECMS 205 may also provide thickness data to CMP system 220 in a feed forward operation. The CMP system may use the thickness data so that it can optimize the metal removal process of the processed batch of wafers. For example, after a batch of wafers have been processed by the CVD system, they may be transported (human operator, robotics, etc.) to the CMP system so that a portion of the just-deposited top layer may be removed using, for example, a CMP planarization process.

Notably, any of the ECMS systems provided herein can provide thickness measurements of patterned and un-patterned wafers and is therefore not reliant upon the use of non-yielding measuring blanks. Implementing an ECMS system may therefore permit an increase in overall wafer yields since the measuring blanks may be replaced with useable patterned wafers. Measurement accuracy is another benefit that may be provided by an ECMS system since the actual patterned wafers, not measuring blanks, undergo thickness measurements.

Typically, one or several of the many wafers of a processed batch of wafers are actually measured by the ECMS systems during the fabrication process. However, every wafer of a process batch may each be individually measured, if desired.

Similar to the CVD system, the CMP system may also use the thickness data to adjust its process parameters to provide optimal processing. CMP process parameters may include the relative positioning of a polishing pad on the wafer, pad velocity, pad pressure, polishing time, slurry recipe, and the like.

If desired, the CMP system may present one or more of the planarized batch of wafers to ECMS 215 so that post-CMP thickness measurements may be obtained. In this scenario, ECMS 215 may perform the required thickness measurements of the selected wafer or wafers and then provide the generated thickness data to the CMP system in a feed back operation. In this configuration, ECMS 215 provides near real-time process control or monitoring of the CMP process. Alternatively or additionally, ECMS 215 may also communicate or provide the generated post-CMP thickness measurement data to the CVD system in a feed forward operation.

Any of the ECMS systems described herein may perform thickness measurements on processed wafers on a periodic or continuous basis as may be required or desired in a particular application. For example, in some instances, one or more wafers of every batch of wafers may be measured by the ECMS system. In other situations, it may be optimal to measure processed wafers on a predetermined or random basis (for example, every hour, once a day, once a week, etc.)

Suitable systems for implementing CVD 210 include, for example, the Endura Electra Cu CVD system marketed by Applied Materials, Inc., of Santa Clara, Calif., and the Altus line of CVD systems developed by Novellus Systems, Inc., of San Jose, Calif. An example of a suitable CMP system 220 includes the Reflexion CMP system of Applied Materials, and Momentum 200 or 300 CMP systems marketed by Novellus Systems.

Figure 13:
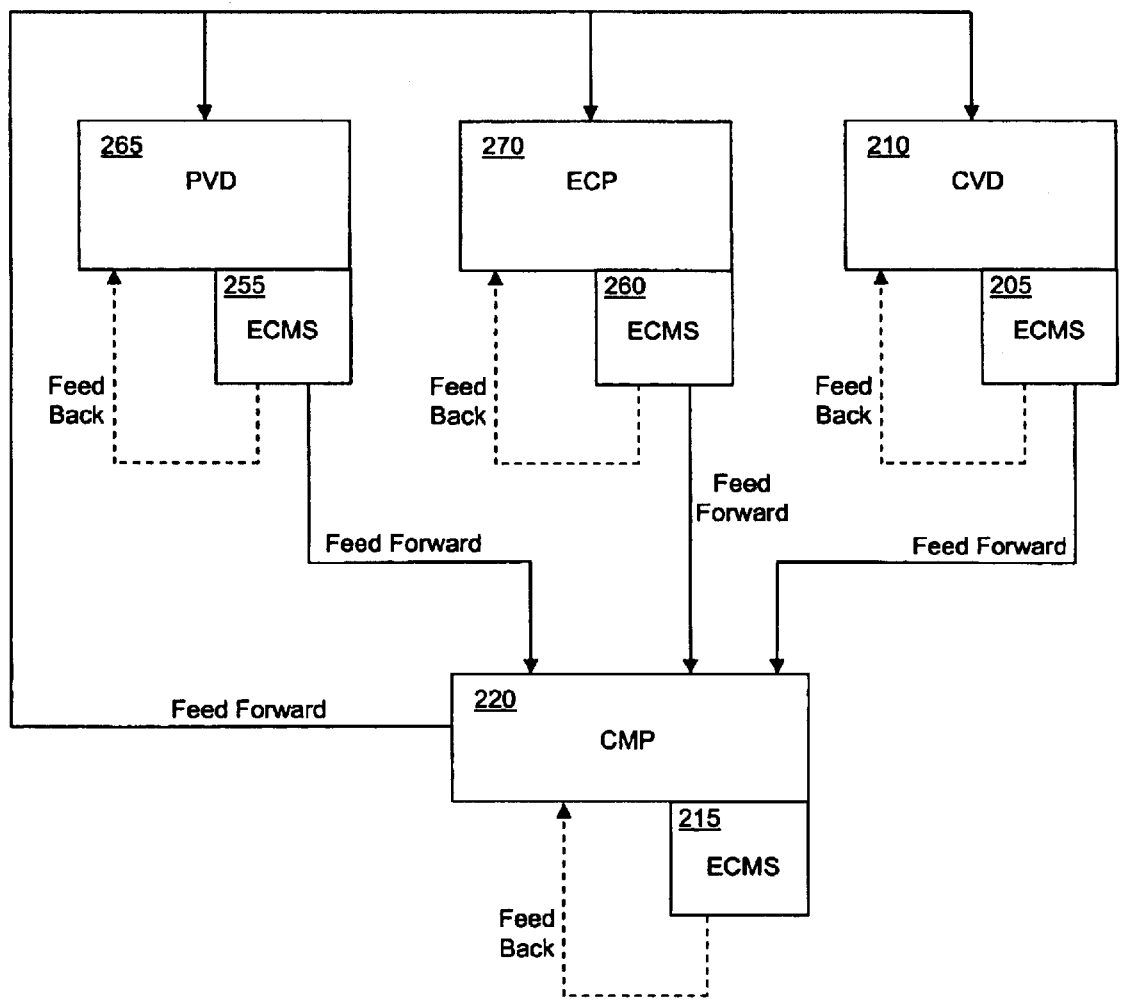
FIG. 13 is a block diagram showing another example of an integrated eddy current measuring system of the invention configured with multiple metal deposition systems.

FIG. 13 is a block diagram showing multiple metal deposition systems configured with integrated ECMS systems. In this figure, ECMS systems 255, 260, and 205 are shown respectively integrated with PVD system 265, ECP system 270, and CVD system 210, while ECMS 215 is configured with CMP system 220. In this arrangement, thickness data of processed wafers may be obtained from any of a variety of different metal deposition systems. This particular embodiment may be implemented to provide system control or monitoring during semiconductor fabrication where different deposition processes (for example, PVD, ECP, CVD, etc.) are utilized during particular stages of fabrication.

Similar to other embodiments, each of the metal deposition and removal systems depicted in this figure represent a conventionally configured semiconductor fabrication setup, as modified to accommodate and utilize an associated ECMS system. A typical semiconductor fabrication process utilizing an ECMS system within a multiple metal deposition system environment may proceed as follows.

First, the PVD system may process a batch of wafers according to well known PVD processing methods, resulting in the deposition of conductive material on a wafer substrate. The PVD system may then present one or more of the processed batch of wafers to ECMS 255 for thickness measurements. After making the required thickness measurements, ECMS 255 may communicate the generated thickness data to the PVD system in a feed back operation, and to CMP 220 system in a feed forward operation.

As before, the CMP system may also use the thickness data to adjust its process parameters to provide optimal processing of the batch of wafers. After processing, the CMP system may present one or more of the planarized batch of wafers to ECMS 215 so that post-CMP thickness measurement may be obtained. After performing the required thickness measurements, ECMS 215 may communicate the generated thickness data to the CMP system in a feed back operation. Alternatively or additionally, ECMS 215 may also communicate or provide the generated post-CMP thickness measurement data to some or all of the metal deposition systems in a feed back operation.

At some point, wafer processing may proceed by subjecting the batch of wafers to additional deposition processes using, for example, any of the deposition systems depicted in FIG. 13. In some cases the wafers may undergo repeated layering cycles using the same metal deposition process (for example, repeated PVD metal deposition cycles). In other situations, the wafers may be further processed using alternating or varying metal deposition cycles (for example, PVD→CVD→CVD→ECP→PVD→CVD, etc.). Regardless of the particular deposition processes utilized (repeated or varying), an integrated ECMS system configured with a particular deposition system may perform the required thickness measurements and provide the generated thickness data using the appropriate feed back and feed forward operations previously discussed.

The PVD and ECP systems may use the calculated thickness data so that they can adjust their respective process parameters for processing subsequent batches of wafers. Typical process parameters for the PVD and ECP systems include one or more parameters such as process time, current or voltage values, solution density, ion source, chamber temperature, and the like.

Examples of a suitable PVD system 265 include the INOVA line of PVD systems marketed by Novellus Systems. The Electra Cu system developed by Applied Materials is one example of an ECP system that may be used for implementing ECP system 270.

Figure 14:
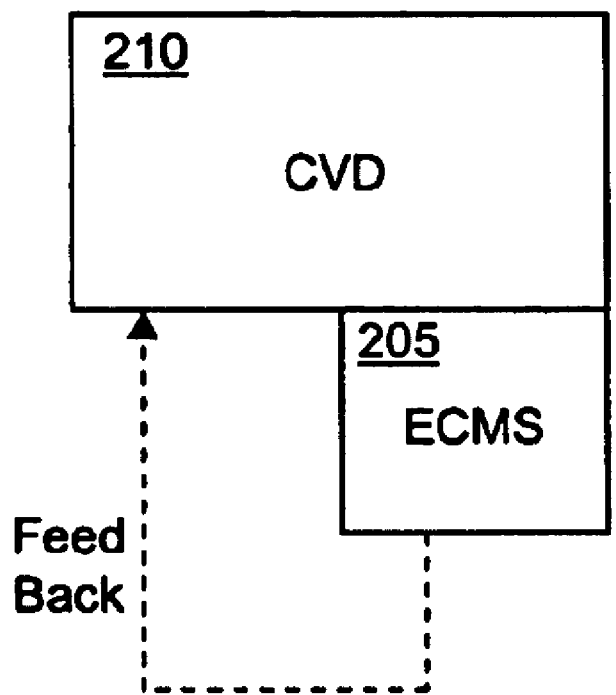
FIG. 14 is a block diagram showing an example of an integrated eddy current measuring system configured with a single metal deposition system.

FIG. 14 is a block diagram showing an example of an integrated ECMS configured with a single metal deposition system. In this figure, a fully functional ECMS system 205 is shown integrated with CVD system 210. This arrangement is often implemented whenever the control or monitoring of a discrete semiconductor fabrication processes is desired. In this specific example, ECMS system 205 is used for generating thickness measurements of wafers processed by CVD system 210. A similar arrangement may be employed for control or monitoring of any of the other metal deposition systems.

It is to be understood that each deposition system can be configured with a fully functional ECMS system (feed forward and feed back capabilities), or with an ECMS system that provides either a feed forward or a feed back operation. Other possibilities include implementing an ECMS system in a limited number of semiconductor fabrication systems. A particular example may include configuring CMP system 220 with a fully functional ECMS system 215, while none of the other metal deposition systems implemented have an ECMS system. Another example is where all of the metal deposition systems have an ECMS system, but CMP system 220 does not have an ECMS system.

Figure 15:
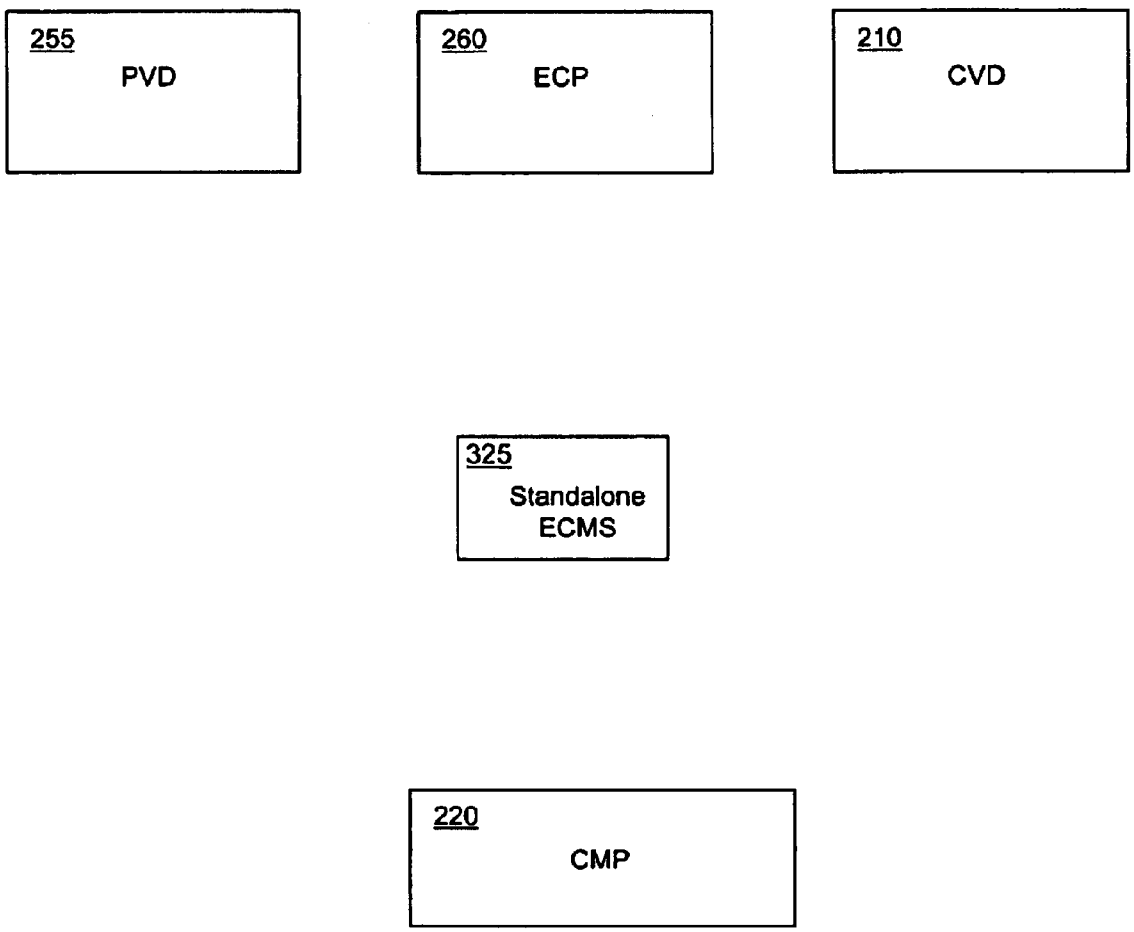
FIG. 15 is a block diagram showing an example of a standalone implementation of an eddy current measuring system.

FIG. 15 is a block diagram showing an example of a standalone implementation of an ECMS. In this figure, standalone ECMS system 325 is shown in a relative spatial relationship to PVD system 255, ECP system 270, CVD system 210, and CMP system 220. This implementation is similar to the configuration depicted in FIG. 13. However, a notable distinction is that the configuration of FIG. 15 does not include the communication of thickness data to any of the various other systems using, for example, feed back and feed forward operations. ECMS system 325 functions as standalone unit.

This particular embodiment may be implemented to provide system monitoring during semiconductor fabrication where different deposition processes (for example, PVD, ECP, CVD, etc.) are utilized during various stages of fabrication. A particular example may be where a system operator may remove particular wafers from the various fabrication systems and manually or mechanically present the wafers to ECMS 325 for thickness measurements. ECMS 325 may then perform the required thickness measurements and present the generated thickness data to the system operator using a display screen, printer, or other suitable output device. If desired, the operator may use this thickness data to verify the performance of each of these fabrication systems.

While the invention has been described in detail with reference to disclosed embodiments, various modifications within the scope and spirit of the invention will be apparent to those of ordinary skill in this technological field. It is to be appreciated that features described with respect to one embodiment typically may be applied to other embodiments. Therefore, the invention properly is to be construed with reference to the claims.

What is claimed is:

1. A method for thickness estimation of a conductive top layer of a substrate sample, said method comprising:
    (a) receiving said substrate sample after said substrate sample has undergone a top layer removal process removing a portion of said conductive top layer of said substrate sample;
    (b) obtaining initial resistance and reactance measurements from said substrate sample using an eddy current probe positioned at an initial distance relative to said substrate sample;
    (c) obtaining terminating resistance and reactance measurements from said substrate sample using said eddy current probe positioned at a modified distance relative to said substrate sample;

(d) calculating an intersecting line using said initial and terminating resistance and reactance measurements;

(e) determining an intersecting point between a previously defined natural intercepting curve and said intersecting line, wherein said natural intercepting curve is defined by a plurality of initial resistance and reactance measurements obtained from at least one calibration sample individually or collectively having a known range of top layer thicknesses;

(f) locating a reactance voltage of said intersecting point along a digital calibration curve to identify a closest-two of said known range of top layer thicknesses, wherein said digital calibration curve is defined by a plurality of initial reactance measurements and corresponding top layer thicknesses of said at least one calibration sample; and (g) estimating a thickness of said conductive top layer of said substrate sample by approximating a location of said reactance voltage relative to said closest-two of said known range of top layer thicknesses of said at least one calibration sample.

2. The method according to claim 1, said method further comprising:

scanning a plurality of locations of said substrate sample to generate a thickness profile, wherein said thickness profile is generated by performing operations (b) through (g) for each of said plurality of locations of said substrate sample; and providing said thickness profile to a top layer removal system that is adapted to provide said top layer removal process.

3. The method according to claim 2, wherein said top layer removal system comprises a chemical-mechanical polishing (CMP) system.

4. The method according to claim 2, said method further comprising:

providing said thickness profile to a metal deposition system that is adapted to provide metal layer deposition on semiconductor wafer products.

5. The method according to claim 2, said method further comprising:

providing said thickness profile to at least one metal deposition system that is adapted to provide metal layer deposition on semiconductor wafer products, wherein said metal deposition system is a system selected from the group consisting of an electro-chemical process (ECP) system, chemical vapor deposition (CVD) system, physical vapor deposition (PVD) system, plasma enhanced CVD (PECVD) system, low pressure CVD (LPCVD) system, rapid thermal CVD (RTCVD) system, and an atmospheric pressure CVD (APCVD) system.

6. The method according to claim 1, wherein said terminating resistance and reactance measurements are obtained after increasing the relative distance between said eddy current probe and said substrate sample.

7. The method according to claim 1, wherein said terminating resistance reactance measurements are obtained after decreasing the relative distance between said eddy current probe and said substrate sample.

8. The method according to claim 1, wherein said approximating is accomplished by performing an interpolation between said closest-two of said known range of top layer thicknesses of said at least one calibration sample.

9. The method according to claim 1, wherein said approximating is accomplished by curve-fitting said reactance voltage to said digital calibration curve.

10. The method according to claim 1, wherein said initial and modified distances relative to said substrate are obtained using a proximity sensor selected from the group consisting of a capacitance sensor, optical laser, Hall effect sensor, thermal IR sensor, and an ultrasound sensor.

11. The method according to claim 1, wherein said at least one calibration sample includes a top layer of a different conductance than said conductive top layer of said substrate sample.

12. A system for thickness estimation of a conductive top layer of a substrate sample, said system comprising:

an eddy current probe comprising an eddy current sense coil;

a controller providing relative motion between said eddy current probe and said substrate sample;

a processor for processing measurements detected by said eddy current sense coil, wherein said processor is configured to estimate a thickness of said conductive top layer of said substrate sample by a method comprising:

(a) receiving said substrate sample after said substrate sample has undergone a top layer removal process removing a portion of said conductive top layer of said substrate sample;

(b) obtaining initial resistance and reactance measurements from said substrate sample using an eddy current probe positioned at an initial distance relative to said substrate sample;

(c) obtaining terminating resistance and reactance measurements from said substrate sample using said eddy current probe positioned at a modified distance relative to said substrate sample;

(d) calculating an intersecting line using said initial and terminating resistance and reactance measurements;

(e) determining an intersecting point between a previously defined natural intercepting curve and said intersecting line, wherein said natural intercepting curve is defined by a plurality of initial resistance and reactance measurements obtained from at least one calibration sample individually or collectively having a known range of top layer thicknesses;

(f) locating a reactance voltage of said intersecting point along a digital calibration curve to identify a closest-two of said known range of top layer thicknesses, wherein said digital calibration curve is defined by a plurality of initial reactance measurements and corresponding top layer thicknesses of said at least one calibration sample; and (g) estimating a thickness of said conductive top layer of said substrate sample by approximating a location of said reactance voltage relative to said closest-two of said known range of top layer thicknesses of said at least one calibration sample.

13. The system according to claim 12, wherein a plurality of locations of said substrate sample are scanned to generate a thickness profile, wherein said thickness profile is generated by performing operations (b) through (g) for each of said plurality of locations of said substrate sample, and wherein said thickness profile is communicated to a top layer removal system that is adapted to provide said top layer removal process.

14. The system according to claim 13, wherein said top layer removal system comprises a chemical-mechanical polishing (CMP) system.

15. The system according to claim 13, wherein said thickness profile is communicated to a metal deposition system that is adapted to provide metal layer deposition on semiconductor wafer products.

16. The system according to claim 13, wherein said thickness profile is communicated to at least one metal deposition system that is adapted to provide metal layer deposition on semiconductor wafer products, wherein said metal deposition system is a system selected from the group consisting of an electrochemical process (ECP) system, chemical vapor deposition (CVD) system, physical vapor deposition (PVD) system, plasma enhanced CVD (PECVD) system, low pressure CVD (LPCVD) system, rapid thermal CVD (RTCVD) system, and an atmospheric pressure CVD (APCVD) system.

17. The system according to claim 12, wherein said terminating resistance and reactance measurements are obtained after increasing the relative distance between said eddy current probe and said substrate sample.

18. The system according to claim 12, wherein said terminating resistance reactance measurements are obtained after decreasing the relative distance between said eddy current probe and said substrate sample.

19. The system according to claim 12, wherein said approximating is accomplished by performing an interpolation between said closest-two of said known range of top layer thicknesses of said at least one calibration sample.

20. The system according to claim 12, wherein said approximating is accomplished by curve-fitting said reactance voltage to said digital calibration curve.

21. The system according to claim 12, wherein said initial and modified distances relative to said substrate are obtained using a proximity sensor selected from the group consisting of a capacitance sensor, optical laser, Hall effect sensor, thermal IR sensor, and an ultrasound sensor.

22. The system according to claim 12, wherein said at least one calibration sample includes a top layer of a different conductance than said conductive top layer of said substrate sample.

23. A method for thickness estimation of a conductive top layer of a substrate sample, said method comprising:
(a) receiving said substrate sample after said substrate sample has undergone a top layer removal process removing a portion of said conductive top layer of said substrate sample;
(b) means for obtaining initial resistance and reactance measurements from said substrate sample using an eddy current probe positioned at an initial distance relative to said substrate sample;
(c) means for obtaining terminating resistance and reactance measurements from said substrate sample using said eddy current probe positioned at a modified distance relative to said substrate sample;
(d) means for calculating an intersecting line using said initial and terminating resistance and reactance measurements;
(e) means for determining an intersecting point between a previously defined natural intercepting curve and said intersecting line, wherein said natural intercepting curve is defined by a plurality of initial resistance and reactance measurements obtained from at least one calibration sample individually or collectively having a known range of top layer thicknesses;
(f) means for locating a reactance voltage of said intersecting point along a digital calibration curve to identify a closest-two of said known range of top layer thicknesses, wherein said digital calibration curve is defined by a plurality of initial reactance measurements and corresponding top layer thicknesses of said at least one calibration sample; and
(g) means for estimating a thickness of said conductive top layer of said substrate sample by approximating a location of said reactance voltage relative to said closest-two of said known range of top layer thicknesses of said at least one calibration sample.

24. A monitoring system providing a thickness profile of a conductive top layer of a substrate sample, said system comprising:
an eddy current probe support;
a plurality of eddy current probes comprising separate eddy current sense coils, wherein said plurality of eddy current probes are configured with said eddy current probe support;
a controller configured with said eddy current probe support providing relative motion between each of said plurality of said eddy current probes and said substrate sample;
a processor for processing measurements detected by each of said plurality of eddy current sense coils, wherein said processor is configured to estimate a thickness profile of said conductive top layer of said substrate sample by a method comprising:
(a) receiving said substrate sample after said substrate sample has undergone a top layer removal process removing a portion of said conductive top layer of said substrate sample;
(b) obtaining initial resistance and reactance measurements from said substrate sample using one of said plurality of eddy current probes positioned at an initial distance relative to said substrate sample;
(c) obtaining terminating resistance and reactance measurements from said substrate sample using said one of said plurality of eddy current probes positioned at a modified distance relative to said substrate sample;
(d) calculating an intersecting line using said initial and terminating resistance and reactance measurements;
(e) determining an intersecting point between a previously defined natural intercepting curve and said intersecting line, wherein said natural intercepting curve is defined by a plurality of initial resistance and reactance measurements obtained from at least one calibration sample individually or collectively having a known range of top layer thicknesses;
(f) locating a reactance voltage of said intersecting point along a digital calibration curve to identify a closest-two of said known range of top layer thicknesses, wherein said digital calibration curve is defined by a plurality of initial reactance measurements and corresponding top layer thicknesses of said at least one calibration sample;
(g) estimating a thickness of said conductive top layer of said substrate sample by approximating a location of said reactance voltage relative to said closest-two of said known range of top layer thicknesses of said at least one calibration sample; and
(h) estimating said thickness profile of said conductive top layer of said substrate sample by repeating operations (b) through (g) for each of said plurality of eddy current probes.

25. The system according to claim 24, wherein said top layer removal process is provided by a chemical-mechanical polishing (CMP) system.

26. The system according to claim 25, wherein said monitoring system is integrated with said chemical-mechanical polishing (CMP) system.

27. The system according to claim 24, wherein said controller rotates said eddy current probe support over said substrate to scan a plurality of locations of said substrate, and wherein an enhanced thickness profile is generated by performing operations (b) through (h) for each of said plurality of locations of said substrate sample.

28. The system according to claim 24, wherein said controller linearly translates said eddy current probe support over said substrate sample to scan a plurality of locations of said substrate sample, and wherein an enhanced thickness profile is generated by performing operations (b) through (h) for each of said plurality of locations of said substrate sample.

\* \* \* \* \*